COMPACT DIFFERENTIAL PRESSURE FORMING MACHINE

Original Filed Oct. 5, 1966 5 Sheets-Sheet 1

INVENTORS
GAYLORD W. BROWN
BRADLEY A. SCHNEPP
BY
Learman & McCulloch

COMPACT DIFFERENTIAL PRESSURE FORMING MACHINE

Original Filed Oct. 5, 1966 5 Sheets-Sheet 2

INVENTORS
GAYLORD W. BROWN
BRADLEY A. SCHNEPP
BY
Learman & McCulloch

COMPACT DIFFERENTIAL PRESSURE FORMING MACHINE

Original Filed Oct. 5, 1966 5 Sheets-Sheet 3

INVENTORS
GAYLORD W. BROWN
BRADLEY A. SCHNEPP
BY
Learman & McCulloch

COMPACT DIFFERENTIAL PRESSURE FORMING MACHINE

Original Filed Oct. 5, 1966 5 Sheets-Sheet 4

INVENTORS
GAYLORD W. BROWN
BRADLEY A. SCHNEPP
BY
Learman & McCulloch

COMPACT DIFFERENTIAL PRESSURE FORMING MACHINE

Original Filed Oct. 5, 1966 5 Sheets-Sheet 5

INVENTORS
GAYLORD W. BROWN
BRADLEY A. SCHNEPP
BY
Learman & McCulloch

United States Patent Office

Re. 27,881
Reissued Jan. 15, 1974

27,881
COMPACT DIFFERENTIAL PRESSURE FORMING MACHINE

Gaylord W. Brown and Bradley A. Schnepp, Beaverton, Mich., assignors to Koehring Company, Milwaukee, Wis.

Original No. 3,513,505, dated May 26, 1970, Ser. No. 584,436, Oct. 5, 1966. Application for reissue May 11, 1972, Ser. No. 252,500
Int. Cl. B29c *11/00;* B29d *7/22*
U.S. Cl. 425—155 11 Claims

Matter enclosed in heavy brackets [ ] appears in the original patent but forms no part of this reissue specification; matter printed in italics indicates the additions made by reissue.

ABSTRACT OF THE DISCLOSURE

A differential pressure forming machine for forming shapes in a sheet of deformable thermoplastic material including: molds on opposite sides of the sheet; at least one of the molds having a mold cavity and one mold being movable relative to the other to substantially engage and separate the molds; wherein an advancing chain grips the sheet for moving it in increments and a reciprocating drive for the chain has a clamp member clamping to the advancing chain during a forwarding stroke.

*The chain at each side of the machine has pins extending laterally outwardly of the outer side of the chain which ride along the undersurface of a laterally extending guide.*

This invention relates to differential pressure forming machines for forming shapes such as containers and lids in a sheet or web of deformable thermoplastic, synthetic plastic material such as polystyrene, polyethylene, and polypropylene, and more particularly to certain new and useful improvements in machines of this character which permit them to be smaller in size and less costly to purchase and operate without effecting their high quality forming precision or reliability.

Another object of the invention is to design a differential pressure forming machine of a more compact nature utilizing sheet advancing chains which are clamped to a drive mechanism during one portion of the travel or stroke of the drive mechanism and released therefrom during the return stroke of the drive mechanism.

*Still another object of the invention is to provide a sheet advancing chain with laterally extending pins or projections which extend laterally outwardly of the outer side of the chain and ride along the underside of a laterally extending guide surface so that the pins or projections are maintained in the same horizontal position to prevent cocking and lateral wobbling from occurring.*

Other objects and advantages of the invention will be pointed out specifically or will become apparent from the following description when it is considered in conjunction with the appended claims and the accompanying drawings, in which:

*FIG. 9 is a fragmentary, side elevational view taken on the line 9—9 of FIG. 3, illustrating the mechanism for moving the mold members;*

*FIG. 10 is an enlarged, fragmentary, transverse sectional view, illustrating the manner in which suction is generated and communicated with the mold cavities; and*

*FIG. 11 is a typical pneumatic-electrical control system for the machine.*

Figure 1:
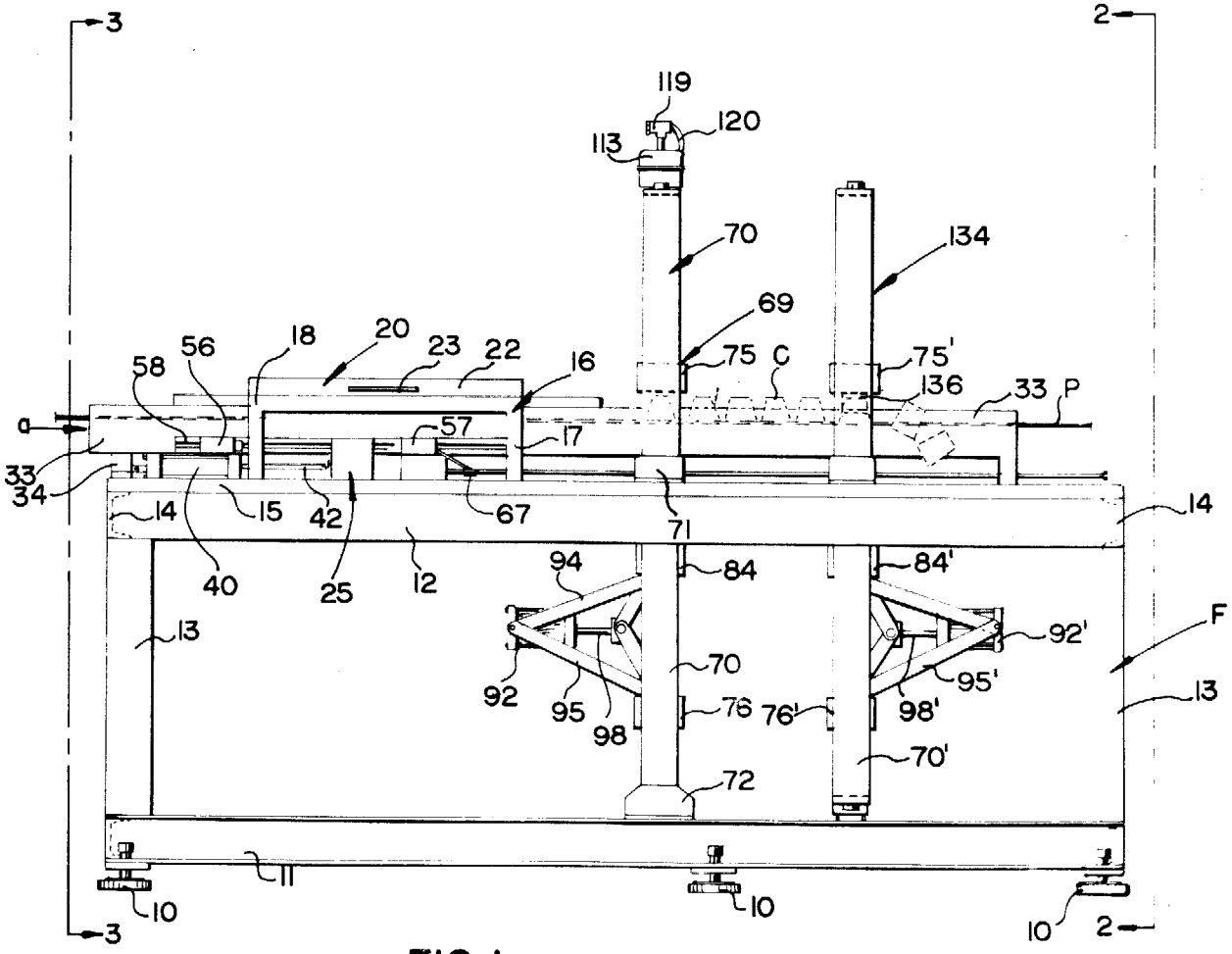
FIG. 1 is a side elevational view of the machine showing a sheet of plastic material entering the machine at the left or charge end, and illustrating cups, which have been formed in the sheet and punched therefrom, being discharged from the machine at the right or discharge end of the machine.
Figure 2:
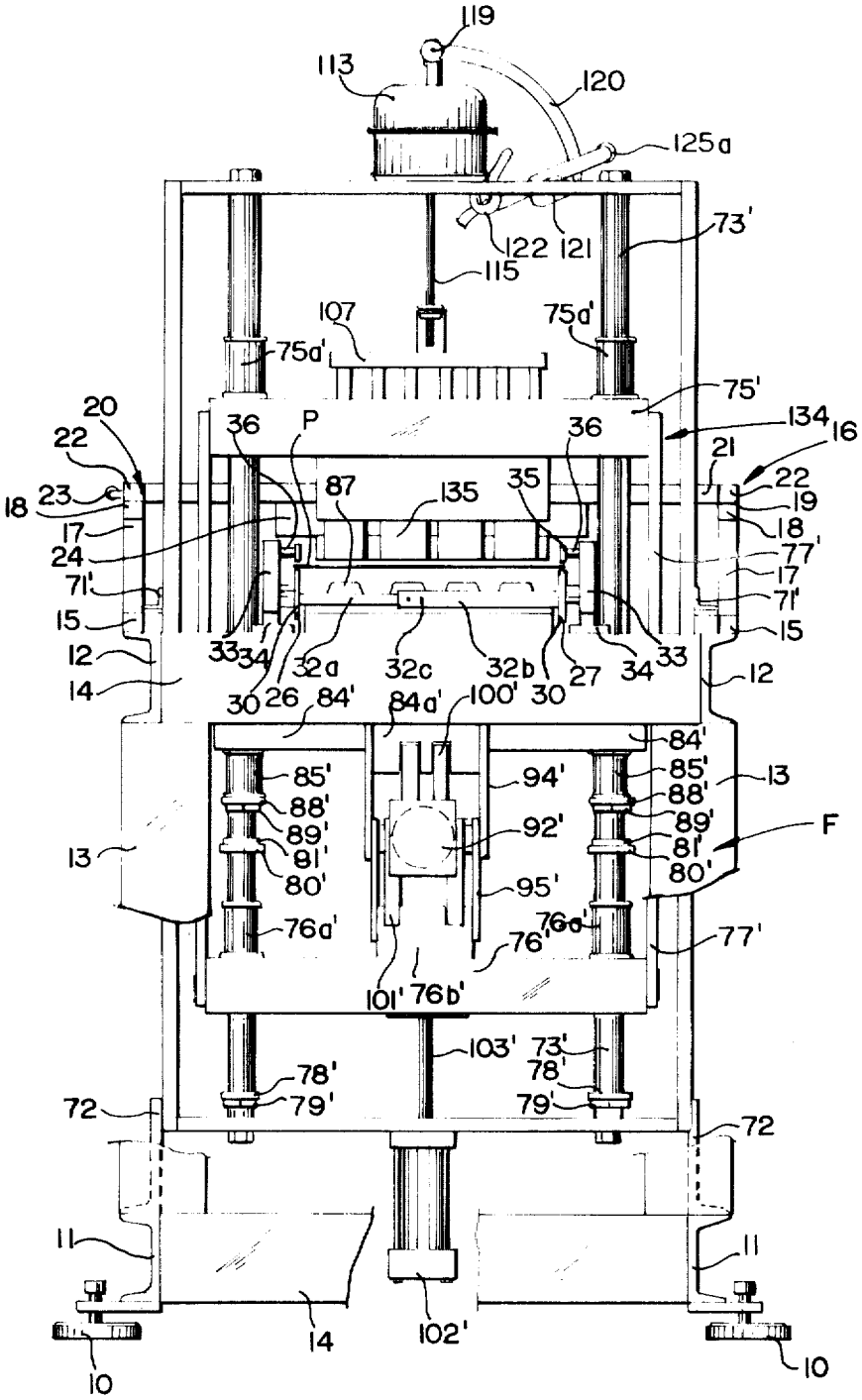
FIG. 2 is an end elevational view of the machine taken from the discharge end thereof on the line 2—2 of FIG. 1.
Figure 3:
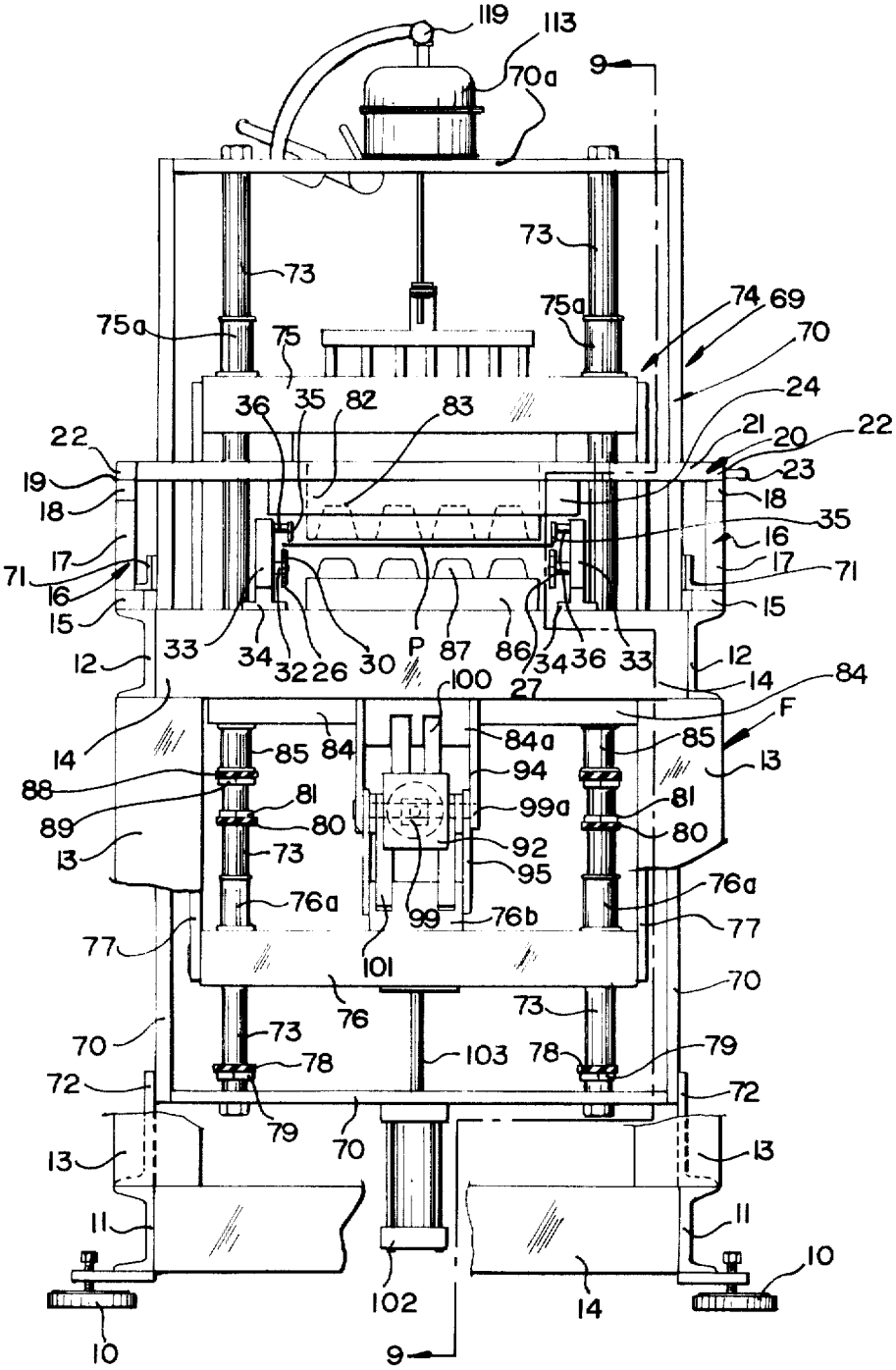
FIG. 3 is an enlarged, end elevational view taken from the opposite charge end thereof on the line 3—3 of FIG. 1.

Referring now more particularly to the accompanying drawings, a letter F generally designates the generally box-like open framework of the machine, which, as shown in FIGS. 1–3, may be adjustably mounted on corner support pads 10. The frame F includes bottom side rail members 11 connected with top side rail members 12 by vertical brace members 13 and end brace members 14. Fixed on the side channel members 12 are support rails 15 which support a frame, generally designated 16 (see FIGS. 1–3), at each side of the frame F which comprises upright support posts 17 and a longitudinal connecting member 18. A plastic sheet heating assembly or heater support frame, generally designated 20, is hinged to the frame 16 at one side of the machine as at 19 and comprises transverse members 21 connected by longitudinal member 22, there being a handle 23 mounted on one of the members 22 at one side so the heater supporting frame 20 be raised about the hinge 19, when desired. Depending from the frame 20 are conventional heater units 24 which may comprise banks of electrically heated resistance rods or, in another form, banks of heating lamps, either of which direct heat rays downwardly to the web or sheet of plastic P which is being advanced incrementally beneath them.

THE SHEET ADVANCING MECHANISM

Figure 4:
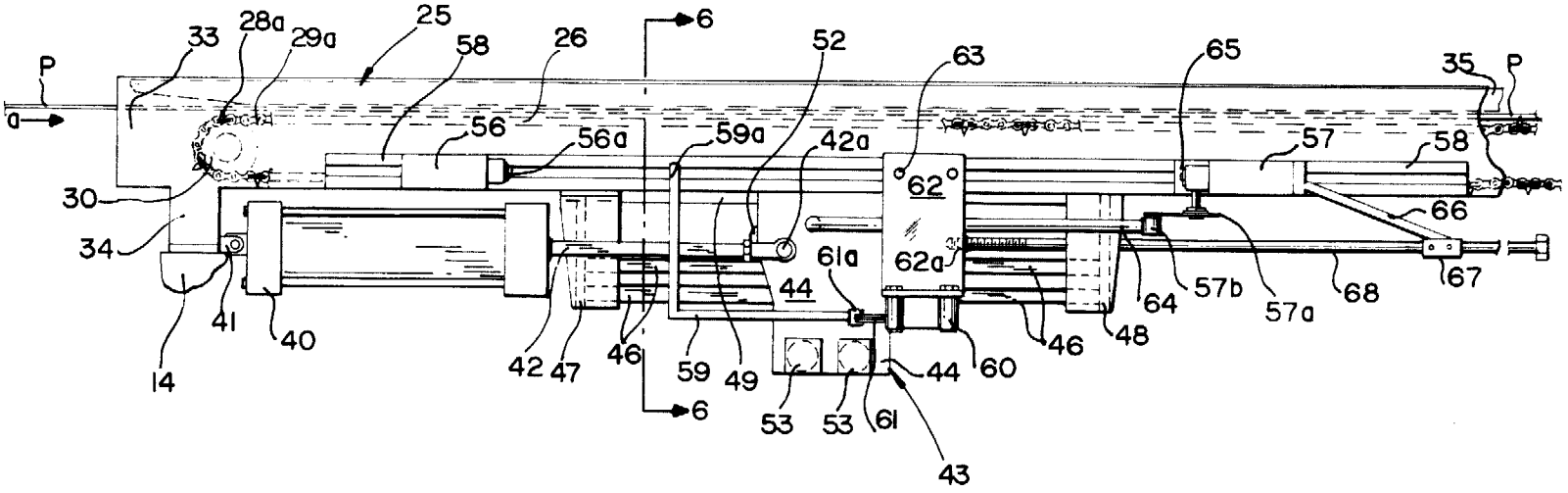
FIG. 4 is a fragmentary, enlarged side elevational view more particularly illustrating sheet advancing mechanism which is employed for moving the plastic web through the machine in incremental steps.
Figure 8:
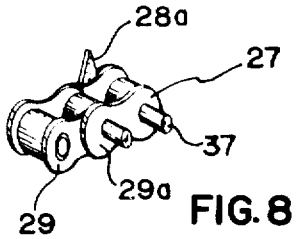
FIG. 8 is an enlarged perspective view of a section of one of the sheet advancing chains.
Figure 7:
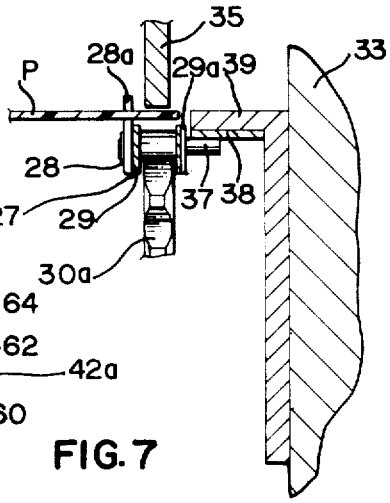
FIG. 7 is an enlarged, fragmentary, transverse elevational view illustrating more clearly the manner in which the sheet advancing chains are guided.
Figure 5:
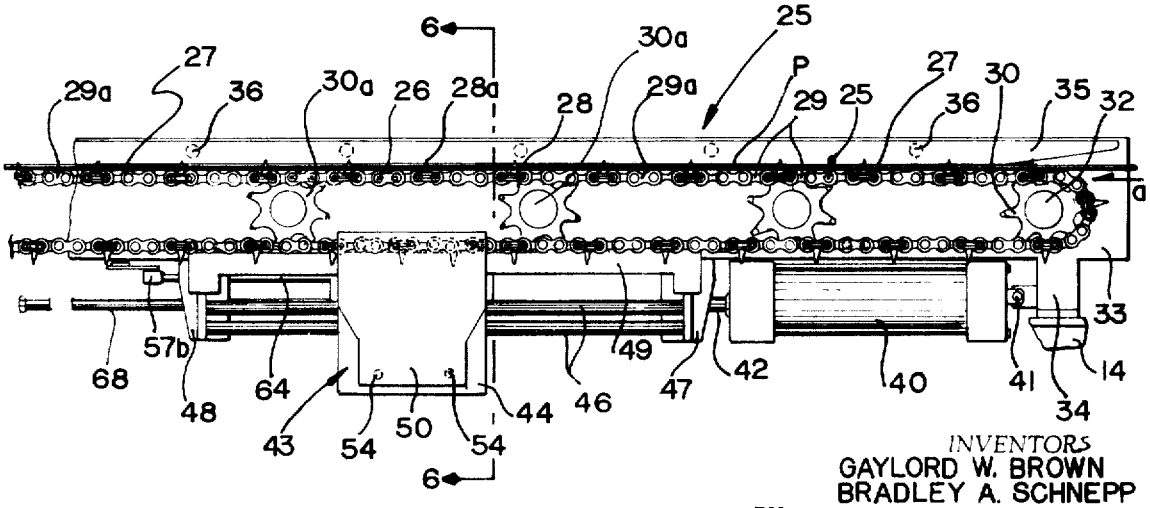
FIG. 5 is a similarly enlarged, fragmentary, opposite side elevational view thereof.

The plastic sheet P is advanced by sheet advancing mechanism, generally designated 25, in the direction of the [arow] *arrow a* (FIGS. 1, 4, and 5) from a roll of the plastic material (not shown). The mechanism 25 preferably includes a pair of endless roller link chains 26 and 27, one of which is mounted on each side of the frame F, and each of which has special links 28 with projecting plastic web piercing pins, *elongate projections,* or teeth 28a (see FIGS. 7 and 8) which are at intervals included with the conventional roller links 29 and 29a of the chains 26 and 27. The chains 26 and 27 are trained around charge end sprockets 30, intermediate support sprockets 30a of smaller diameter, and discharge end sprockets 31, sprockets 30 and 30a being rotatably mounted on stub shafts 32 and sprockets 31 being fixed on a pair of telescopic shafts of square cross-section (FIG. 2) 32a and 32b which may be releasably held in position by a set screw 32c. The shafts 32 are supported by side rails 33 which have legs 34 mounted on the [supper] *upper* frame end rails 14. *Plastic sheet* guides 35[,] *are* mounted on support posts 36, *which* [extending] *extend* inwardly from the side rails 33, *laterally inwardly of the laterally outer sides of the links 29 and 29a* above the upper runs of endless chains 26 and 27[,] *to* positively guide the edges of plastic web P. As FIG. 8 indicates, the connecting pins 37 on which the roller links are mounted extend *laterally* outwardly *of the laterally outer sides* to ride along the *undersides of the* strips of hardened steel 38 which are supported *alongside the upper runs of the chains* by angle members 39 from the side rails 33 at each side of the machine. *The pins or projections 37 riding on the strips 38 laterally stabilize the upper runs of the chains.* The strips 38 *which* may be conventional band saw steel *and are disposed laterally outwardly of the sides of the links 29 and 29a, are positioned to permit the lateral edges of the plastic sheet P to extend above, and laterally outwardly of, the sides of the links 29 and 29a to accommodate plastic sheets P of differing widths.*

Figure 6:
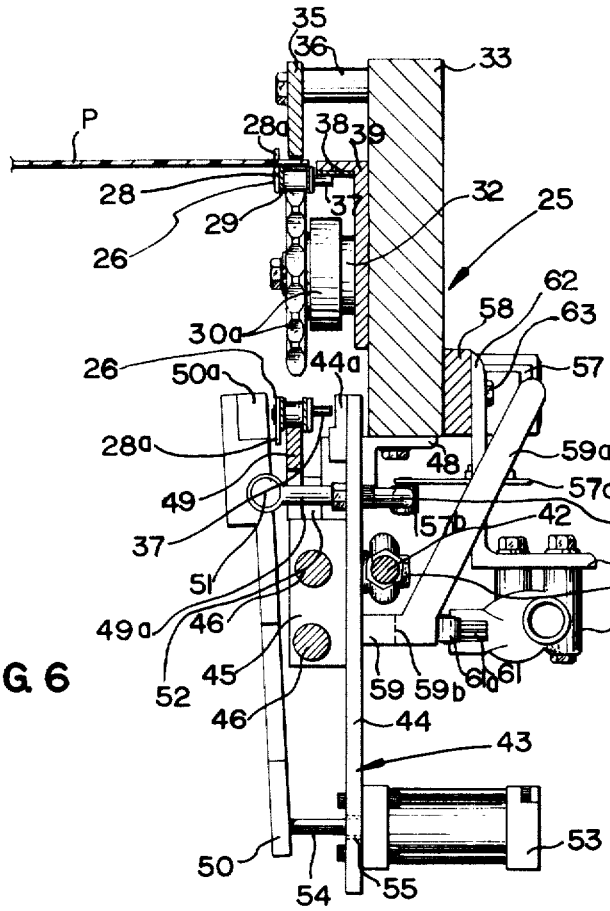
FIG. 6 is an enlarged, transverse sectional view taken on the line 6—6 of FIG. 5.

An air cylinder 40 pivotally connected to a leg 34 of one of the side rails 33 (see FIG. 4), as at 41, has an extending piston rod 42 connected to a clamp plate assembly generally designated 43 which is operable to clamp to a lower run of the chain 26 on the retract stroke of cylinder 40 and to be released from it on the advance stroke thereof. As shown particularly in FIGS. 4 and 6, the assembly 43 includes a back plate 44 secured to a block 45 which is mounted for reciprocation on stationary guide rods 46 supported by brackets 47 and 48 depending from one of the side rail members 33. A lower run chain guide 49 is also supported from the brackets 47 and 48 on spacer blocks 49a and a wear strip 44a of suitable material such as brake lining is provided on the plate 44 opposite pins 37. The piston rod 42 pivotally connects, as at 42a, with the back plate 44 of clamp assembly 43 and operates to reciprocate the assembly. Also forming a portion of the clamp assembly 43 is a pivotal chain engaging clamp plate 50 which is mounted for pivotal movement in a vertical plane about a pivot pin 51 supported from the back plate 44 by an eyebolt 52. The plate 50 includes a nylon liner strip 50a which serves as the clamping surface. To actuate the plate 50 to a gripping position in which strip 50a engages the chain 26 and the pin ends 37 are clamped against the wear strip 44a, a pair of fluid pressure operated cylinders 53 are provided having piston rods 54 extending freely through openings 55 provided in the plate 44 to engage the lower end of movable clamp plate 50 and pivot it about the pin 51 into engagement with the lower run of chain 26.

Provided to operate the double-acting cylinder 40 are a pair of limit switches 56 and 57 which are supported in adjusted position on a mounting channel 58 fixed to the side member 33. The depressible plunger 56a of limit switch 56 is adapted to be engaged by the vertically extending portion 59a of an actuator plate 59 which is fixed to the outer face of back plate 44. The member 59 also serves to actuate a cushioning valve 60 (FIG. 6) having a pivotally mounted actuator arm 61 with a roller 61a which rides on member 59. At the end of the advance stroke of piston rod 42 the roller 61a encounters dwell portion 59b and permits a valve spring to pivot arm 61 to operate the valve 60. Valve 60 is connected to the cylinder 40 and is operable to introduce a cushioning fluid to the forward end of cylinder 40 at the end of the advance stroke of piston rod 42 and cushion the stroke at a time when the cylinder 40 is not connected to chain 26. The cushioning valve 60 may be supported from an angle plate 62 which is bolted as at 63 to the mounting channel 58.

The limit switch 57 is provided with a pivotal actuator arm 57a (see FIG. 4) having a roller 57b which is in position to be engaged by a rod 64 carried by the plate 44 at the end of the forward stroke of piston rod 42. A plate 65 which is mounted for sliding movement by the channel 58 supports the limit switch 57 in adjustable position, there being a rod 66 connecting the plate 65 with a sleeve 67 having a threaded bore which accommodates a threaded adjusting rod 68. The rod 68 has its inner, enlarged end rotatably mounted in a socket 62a in the plate 62 and restrained from movement in an axial direction. As will be clear from the descriptive matter to follow, the cylinders 53 are actuated to cause the plate 50 to clamp the lower run of chain 26 when the piston rod 42 is in extended position, so that the lower run of the chain 26 is moved from right to left in FIGS. 1 and 4 during the retract stroke of cylinder 40 and the upper run moves from left to right and advances the sheet of plastic P. On the forward stroke of cylinder 40, when the plastic sheet is not being transferred and the cylinder 40 is not connected to a load, valve 60 cushions the forward stroke.

THE MOLD OPERATING MECHANISM

Provided ahead of the web heating assembly 20 is the forming station, generally designated 69 (FIG. 1), which includes forming apparatus mounted on a rectangularly shaped frame generally designated 70 secured to the rails 15 by angle members 71 and to the channel members 11 by angle members 72. As FIG. 3 indicates, a pair of transversely spaced vertical guide rods 73 are bolted on the frame 70 and mounted on the guide rods 73 for vertical travel is a platen assembly generally designated 74 and comprising an upper platen member 75 and a lower support member 76 connected by side bars 77. The upper platen member 75 has integral bushing members 75a and the lower member 76 has integral bushing members 76a which support the assembly for reciprocating movement on the guide rods 73. Rubber cushion members 78 are provided between the member 76 and blocks 79 fixed on the guide rods 73, and similar rubber bumper members 80 are provided on the rods 73 between the bushings 76a and blocks 81 fixed on the guide rod 73. The members 78 and 80 which are secured to the blocks 79 and 81, respectively, define the lower and upper limits of travel, respectively, of the member 76 and accordingly limit the travel of the entire platen assembly 74. The upper platen member 75 supports the mold 82 which includes mold cavities 83 and will be later described in more detail.

Also mounted on the guide rods 73 for upward and downward travel is a lower platen 84, having integral depending bushings 85, which mounts a male mold member 86 with plug assist members 87. Similar rubber bumper members 88 are provided on blocks 89 fixed to the rods 73 to cushion downward travel of the platen 84, and rubber bumper members 90 supported by blocks 91 on the rods 73 are provided to cushion upward travel of the platen 84.

Provided to move both the platen assembly 74 and the lower platen member 84 is a double-acting pressure fluid actuated cylinder 92 pivotally supported as at 93 by divergent links 94 and 95 which are pivotally connected to a central block 76b on the member 76 as at 96 and to a depending central block 84a on the lower platen 84 as at 97. The piston rod 98 of cylinder 92 mounts a block 99 which is pivotally, as at 99a, connected with pairs of upper links 100 and lower links 101. The links 100 and 101 are connected with the platen 84 and member 76 by the pins 97 and 96, respectively, and operate to move these members upwardly and downwardly. An air cylinder 102 mounted on the frame 70 and having a piston rod 103 extending freely through the frame 70 to connect to the member 76 is at all times supplied with a predetermined pressure so that the platen assembly 74 is, in effect, supported on a cushion of air.

The mold 82 is shown as having a vacuum chamber 104 (FIG. 10) connected with the mold cavities 83 by ports 105 and connected with vacuum conduits 106 extending from an exterior vacuum manifold 107 by passages 108 in the platen 75 and 109 in the mold 82. The hollow manifold 107 is alternately connected with a flexible vacuum line 110 and with an air line 111 by a T fitting 112. Air under pressure is supplied through the line 111 at a proper time to eject the parts from cavities 83 at the end of the forming cycle in a manner which will be described.

THE SUCTION CREATING MECHANISM

The present machine creates its own vacuum and requires no motor operated vacuum pump or the like.

Mounted on the upper cross bar 70a of the frame 70 is a diaphragm housing 113 (FIG. 10) having a diaphragm 114 connected therein at its perimetral edge. A diaphragm actuating rod 115 mounting spaced apart rod stops 116 and 117 depends from the chamber 113 and passes freely through an opening 115a provided in cross bar 70a. A bracket 118 having a flange 118a provided in the top of manifold 107 cooperates with the rod stops 116 and 117 to move the actuator rod 115.

When the mold platen 75 is moving upwardly after having formed a row of containers or parts, the diaphragm 114 is moved upwardly with it to exhaust air in the chamber 113 out an exhaust check valve 119 (FIG. 9), which permits the egress of air but does not permit air to enter chamber 113. Thus, when the platen 75 is again moved downwardly to form another row of parts, a vacuum is created within chamber 113, which may be connected to vacuum line 110 through a vacuum line 120 and a normally closed, mechanically operated valve 121. A conventional dial cock throttling valve 122 in line 110 may be adjusted to obtain the suction force desired.

The valve 121 is of the type which has a through passage 123 normally bocked by a plug 124 and carries a plug unblocking actuator arm 125 pivoted at 126 and held in the position shown by a coil spring 127 connected as at 128 to frame 70 and to the arm 125 at 129. The plunger 124 is urged to outward position to free the passage 123 by a spring 130 but is normally maintained in closed position by lever 125.

A valve actuating lift rod 131 fixed to a block 132 (see FIG. 9) on the lower platen 84 is mounted for sliding movement by a guide 133 supported from frame 70 and is positioned to engage a follower roller 125a on the valve actuator arm 125 and lift the arm 125 to communicate the vacuum lines 120 and 110. As previously noted, the upper platen 75 comes down into lowered position prior to the time that the platen 84 moves upwardly, and thus vacuum is created in the chamber 113 prior to the time the lift rod 131 raises the actuator arm 125 of valve 121 to permit vacuum to communicate with the mold 82.

THE SEVERING ASSEMBLY

Provided downstream of the forming assembly 69 is a severing station generally designated 134 (see particularly FIGS. 2 and 9) which operates in the same manner as the mold assembly 69 except that in place of a female mold 82 a row of tubular cup-severing dies 135 are provided having sharpened peripheral cutting edges 135a and, in place of a male mold 86 having plug assists 87, a cutting block 136 is provided. The cut out dies 135 are mounted on an upper platen 75' and the block 136 is mounted on a lower platen 84', and the platen support and actuating elements are identical to those which support and actuate the forming platens 75 and 84. Accordingly, primed numerals have been used to designate the identical parts in the drawings which need not again be described. In operation, however, the pressure fluid maintained in cylinder 102' is such, relative to the pressure maintained in the cylinder 92', that the lower platen 84' with its cutting block 136 moves upwardly to engage the underside of the plastic sheet P prior to the time the upper platen 75' descends to cut a row of cup-shaped containers C from the plastic web P.

THE CONTROL CIRCUIT

In FIG. 11 we have shown a schematic diagram of a typical control circuit which may be employed. In this circuit a timer device T of conventional character, such as an Eagle timer, is provided in circuit line b spanning the circuit line wires $L_1$ and $L_2$ which may be connected with a suitable source of operating current. The contacts 57c of limit switch 57 are also disposed in circuit line b and function to start the timer T. Connected in a circuit line c for controlling the passage of air to line 111 is a normally closed, solenoid actuated, spring returned air valve 137 which, when the limit switch contacts 138 (FIG. 9) of limit switch 138a are closed, opens the valve 137 and permits a blast of air to proceed through line 111 to the mold 82. The limit switch 138a may be tripped by a trip arm 138b at a time when the male mold 86 is descending and at this time the mechanically operated valve 121 which communicates the vacuum line 120 with the mold 82 is already closed, as will later be explained. Provided in a circuit line d is a solenoid operated, normally closed, spring returned air valve 139 which may be opened to pass air under pressure through a line 86a to the male mold 86 to assist in the plastic forming operation. Valve 139 may be controlled by the contacts 140 of a limit switch 140a (FIG. 9) which is in position to be actuated by a trip 140b on lifting rod 131. As in the present assignee's copending application Ser. No. 293,959, entitled Differential Pressure Forming Apparatus, this forming air is provided after the deformable plastic has been moved into the forming cavities 83 by the male assist plugs 87 and just prior to the time the mold member 86 has completed its upward travel. An air manifold 86b (FIG. 10) and air passages 86c may be similarly provided in mold 86.

A solenoid actuated, spring returned, four-way Mac valve 141 is connected in a circuit line e with the contacts R–1 of a relay R disposed in a circuit line h and the contacts 56b of limit switch 56 and operates the double-acting cylinder 92 to move the mold members 82 and 86 to the forming position. Connected in circuit line f is the solenoid of a solenoid-actuated, spring returned, four-way Mac valve 142 in series with the contacts $R_2$ of relay R and the contacts 150 of a limit switch 148 which is closed when the member 84' reaches its lower-most position. Connected in circuit line g is the solenoid of a solenoid-actuated, spring returned air valve 143 which is actuated at the same time cylinder 92 is operated to operate cylinder 92' and move the cutter block 136 and cutting dies 135 to severing position. Relay contacts $R_3$ and the contacts 56c of limit switch 56 are also connected in the line g. Timer contacts $T_1$ are also connected in line h and relay contacts $R_4$ are in a circuit line b'.

In operation, the plastic sheet P is advanced in the first place when air through the air supply line 144 (FIG. 11) passes through air valve 142 to the cylinder 40 to move the rod 42 to retracted position. This occurs when at the end of the cycle the platen 84' returns to lowermost position and makes limit switch 148 to close contacts 150 and energize valve 142 to cause piston rod 42 to move to extended position and make limit switch 57 whose adjusted position determines the length of the sheet advancing stroke. The closing of contacts 57c starts the timer T and closes contacts T–1 which energize relay R so that contacts $R_2$ open and the valve 142 is spring returned to cause air to reach cylinder 40 in a manner to retract piston rod 42. At this time, air is being admitted to the right end of cylinder 40 in FIG. 4 via air line 144 and is being discharged from the left end of cylinder 40 through air line 145 and normally inactive throttling valve 60. The four-way valve 142 is of the type which has an exhaust 146 and air proceeding from the left end of cylinder 40 is exhausting from valve 142 through the exhaust port 146. During the retract stroke the cushioning or throttling valve 60 is in fully opened position and does not operate to restrict the line 145. Simultaneously with the admission of air to the right end of cylinder 40 in FIG. 5, air is admitted to the clamping cylinders 53 through a line 147 to extend the piston rods 54 thereof and pivot clamp plate 50 so that the lower run of the chain 27 is gripped tightly thereby. The drive of chain 26 is transmitted from chain 26 to chain 27 by the square-in-cross-section shaft members 32a and 32b, shaft 32b being tubular to telescopically receive shaft 31a and provide for any axial adjustment which is necessary. In this way the plastic web or sheet P, which has been exposed to the heat rays of the web heating assembly 20 and is in a deformable state, is transferred to a position between the female mold 82 and plug mold 86.

As FIG. 1 indicates, in the machine illustrated a single row of containers C is being formed at one time and the length of the advancing stroke is just slightly greater than the diameter of one of the containers C which is formed. The incremental distance between the mold elements at 69 and the severing elements at 134 is such that a row of containers C which has been formed in the plastic web P has cooled to a solid state upon the completion of the predetermined number of intermittent advancing movements which will dispose the row between the severing elements 135 and the cutting block 136. Thus, the cut-off sleeves 135 are located at a predetermined incremental distance downstream from mold 82 such that each container C which has been formed in the web P is, after cooling, received beneath one of the tubular cutting sleeves 135, properly located for the severing operation.

At the end of the retract stroke of the piston rod 42, the tripper end 59a actuates limit switch 56 and the contacts 56b and 56c are closed so that the forming cycle may commence. Contacts 56b operate the valve 141 which controls cylinder 92 and at the same time contacts 56c are closed to operate valve 143 which controls the cylinder 92'. At this time the piston rods 98 and 98' of cylinders 92 and 92' are in retracted position and the operation of valves 141 and 143 is such as to supply air to the cylinders 92 and 92' in a direction of flow to extend the rods 98 and 98'. In the case of cylinder 92, air pressure is provided on the upper side of the piston rod of balancing cylinder 102 such that cylinder 102 and the forces of gravity aid in forcing the member 76 downwardly. Accordingly, because the cylinder 92 is not connected to the frame of the machine and can readily tilt, initial extension of the piston rod 98, which would, of course, initially expand the links 100 and 101 and 94 and 95, will first of all move the platen assembly 74 and mold 82 downwardly prior to any substantial upward movement of the lower platen member 84.

As FIG. 10 indicates, this initial downward movement of mold 82 is transmitted to the rod 115 because of the flange 118a engaging the stop 117 on rod 115 and moving it downwardly. Since there is relatively little space between the stops 116 and 117 on the rod 115, the rod 115 has very little dwell when the mold 82 starts downwardly and a suction is created in chamber 113 almost immediately, when the mold 82 starts downwardly. During the time that the mold 82 is moving down to the plastic sheet P, the lift rod 131 is in the "down" position shown in FIG. 10 and the normally closed mechanical valve 121 blocks the suction line 110. By the time that the mold 82 is substantially down on the sheet, further extension of piston rod 98 and further expansion of the links 100–101 and 94–95 have commenced to move the lower platen 84 upwardly and, with the mold 82 in fully down position, the plug assists 87 move upwardly into the mold cavities 83 and distent the soft plastic into the cavities 83 in the usual manner. Shortly before the male mold 86 reaches its uppermost position, the lift rod 131, which, as previously noted, is rigidly carried by the lower platen 84, engages the roller 125a and raises the actuating arm 125 of valve 121 to communicate the suction in chamber 113 with the mold cavities 83. At the same or substantially the same time, the trip 140b actuates limit switch 140a, closes the contacts 140 thereof and operates valve 139 to release air under pressure to the male mold 86, which assists the vacuum in drawing the plastic web P finally into intimate engagement with the configurations of the mold cavities 83. The extension of piston rod 98 is such that the links 100 and 101 reach a position of vertical alignment or a center position in which they mechanically lock the molds 82 and 86 together and prevent their separation during the forming operation. In this way a tight seal is achieved throughout the forming operation with molds 82 and 86 in tight engagement with the plastic web P.

At the same time cylinder 92 is being operated in the forming cycle, cylinder 92' is being operated to cut a row of formed containers C from the plastic web P. In this case, however, air pressure is maintained in the lower end of cylinder 102' and is not overcome by the initial expansion of links 100' and 101' and 94' and 95', so that, prior to any substantial movement of the platen member 76' downwardly, the platen 84', which carries the severing block 136, is moved upwardly into engagement with the bottom of the plastic sheet P. Only then does the pressure in cylinder 92' overcome the pressure in cylinder 102' sufficiently to move the entire upper platen assembly 74' downwardly so that the cutting edges 135a sever a row of containers C from the plastic sheet P. As indicated in FIG. 1, the cups so severed are free to fall to a collecting conveyor (not shown) disposed in position to catch them, and the plastic web P moves on and is discharged at the right end of the machine.

The valves 141 and 143 are spring returned valves which reverse the flow of air to cylinders 92 and 92', respectively, when the timer T times out to deenergize relay R so that contacts $R_1$ and $R_3$ are opened once again. Due to the fact that air pressure is maintained in the lower end of cylinder 102, initial retraction of the piston rod 98 of cylinder 92 will first cause the lower platen 84 to return from the sheet, and only thereafter with further contraction of links 100, 101 and 94, 95 will the platen assembly 74 and its female mold 82 be raised. With downward movement of the platen 84 and lift rod 131, spring returned valve 139 is permitted to close and discommunicate the air line 86a from the air supply line 144. When the platen 84 is lowered it is, of course, assisted by the forces of gravity and almost immediately actuator rod 131, in lowering, permits the spring 127 to move actuator arm 125 downwardly and close the valves 121 to block line 110. Shortly thereafter, the switch 138a is actuated by the downwardly moving trip arm 138b, and contacts 138 are closed to actuate valve 137 and permit a blast of air to be delivered through line 111 and the tee 112 to the suction cavities 83. This blast of air exerts a downward force on the containers C formed in the plastic web P at a time when the platen assembly 74 is commencing to move upwardly, and permits the mold 82 to raise without drawing the plastic web P upwardly with it. Upward movement of the mold 82 is transmitted via the stop 116 to the diaphragm rod 115, which raises the diaphragm 114 to push air in the chamber 113 out the exhaust port 119 and sets the stage for the suction creating downward stroke of diaphragm rod 115.

In the case of the container severing assembly 74', and with pressure maintained in the upper end of cylinder 102', it is the platen assembly 74' carrying the cutters 135 which is first returned from the sheet P to raised position upon retraction of piston rod 98'. Thereafter, with further contraction of links 100', 101', and 94', 95', the platen 84' and cutting block 136 are lowered to initial position. Upon return of the molds 82 and 86 to separated position, and with timer T previously timed out so that relay contacts $R_2$ are closed, contacts 150 are made as previously observed to start the sheet advancing cycle again. The extending of the piston rod 42 initially has no effect on the chains 26 and 27 because the clamp plate 50 has been moved to non-clamping position.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims. For instance, while we have illustrated a horizontal machine, it is also contemplated that a vertical machine may be manufactured in which the plastic web P proceeds vertically through the machine.

We claim:

1. In a differential pressure forming machine for forming shapes in a sheet of deformable thermoplastic material; opposing mold parts; one of which has mold cavity means therein; sheet gripping and advancing means including an endless link chain having upper and lower runs with vertically extending sheet penetrating members and having a longitudinal path of travel for advancing at least a portion of said sheet to a position between said mold parts and removing it therefrom after it has been formed; drive means; reciprocable clamp means operably connected with said drive means to be driven thereby in a to and fro path of movement; means for operably coupling said clamp means to the lower run of said chain means to move the sheet during a portion of the travel of said drive means to advance the sheet for disengaging the clamp means during another portion of the travel of said drive means to permit the clamp means to return; said clamp means including first and second upwardly extending plates; and means for moving one of said plates relative to the other to clamp the lower run of said chain therebetween, one of said plates being pivotally mounted about a pivot pin extending from the other of said plates for pivotal movement in a vertical plane.

2. The combination defined in claim 1 in which said drive means comprise a fluid pressure operated power cylinder; and means for damping the stroke of said cylinder when said clamp means is disengaged.

3. A differential pressure forming machine as set forth in claim 1 wherein said endless chain means includes laterally extending connecting pins extending beyond at least one of the edges of said chain; and wear strip means is mounted on one of said plates for engagement by said connecting pins when said lower run of said chain is clamped between said plates.

4. A differential pressure forming machine as set forth in claim 1 including a guide member extending inwardly of the lateral edge of the sheet above the upper run of said chain to positively guide the edge of said sheet.

5. A differential pressure forming machine as set forth in claim 1 wherein said means for moving one of said plates is connected with said one plate adjacent one end thereof and said one plate engages said chain adjacent the opposite end of said plate; said pivot means being located adjacent said opposite end to provide increased gripping force between the plates and the chain.

6. A differential pressure forming machine for forming shapes in a sheet of deformable thermoplastic material having lateral edges including: opposing mold parts; one of which has mold cavity means therein; sheet gripping and advancing means including an endless link chain having upper and lower runs with vertically extending sheet penetrating members and having a longitudinal path of travel for advancing at least a portion of said sheet to a position between said mold parts and removing it therefrom after it has been formed; drive means for moving the chain and sheet; a guide member extending inwardly of one of said lateral edges of said sheet above the upper run of said chain to positively guide said one edge of said sheet; and a laterally extending guide member adjacent the laterally outer side of said upper run of said chain; said chain further including pins extending laterally outwardly of the outer side of said chain and riding along said laterally extending guide member.

7. A differential pressure forming machine as set forth in claim 6 including reciprocable clamp means operably connected with said drive means for to and fro movement; means for operably coupling said clamp means to the lower run of said chain means to move the sheet during a portion of the travel of said drive means to advance the sheet and for disengaging the clamp means during another portion of the travel of said drive means to permit the clamp means to return.

8. A differential pressure forming machine as set forth in claim 7 wherein said clamp means further includes first and second upwardly extending plates; and means for moving one of said plates relative to the other to clamp the lower run of said chain therebetween.

9. A differential pressure forming machine as set forth in claim 8 wherein one of said plates is pivotably mounted for pivotal movement in a vertical plane.

*10. A differential pressure forming machine for forming shapes in a sheet of deformable thermoplastic material having lateral edges including: opposing mold parts, one of which has mold cavity means therein; sheet gripping and advancing means including a pair of laterally spaced apart longitudinally extending link chains each having vertically spaced upper and lower runs and comprising a plurality of pivoltally connected links having laterally inner and outer sides, a plurality of generally vertically extending sheet penetrating members mounted on said links for supporting one lateral edge of at least a portion of said sheet on the upper run thereof, and means for supporting and driving the chains to move the upper and lower runs in said endless path of travel and advance said portion of said sheet on said upper run to a position between said mold parts and remove it therefrom after it has been formed, said latter means including a series of longitudinally spaced sprockets mounted by said frame between said upper and lower runs and extending from one end of each chain to the other; sheet guide members having guide surfaces extending above the upper runs of said chains to positively guide the upper surfaces of the lateral edges of said sheet; upper run chain guide members extending alongside said upper runs and positioned to permit the lateral edges of said sheet to extend above and laterally outwardly of said outer sides of said links, said chain guide members having under guide surfaces spaced laterally outwardly of the laterally outer sides of the links in the upper runs of said chains; and a plurality of elongate lateral projections on said links projecting laterally outwardly of said laterally outer portions of the links and positioned vertically to normally laterally align with said under guide surfaces when the links are traveling along said upper runs so that the projections on the links on the upper runs ride along the guide surfaces of said upper run chain guide members to maintain said projections in the same horizontal disposition and prevent said chains and projections from cocking.*

*11. A differential pressure forming machine for forming shapes in a sheet of deformable thermoplastic material having lateral edges includings opposing mold parts, one of which has mold cavity means therein; sheet gripping and advancing means including a pair of laterally spaced apart longitudinally extending link chains each having vertically spaced upper and lower runs and comprising a plurality of pivotally connected links having laterally inner and outer sides, a plurality of generally vertically extending sheet penetrating members mounted on said links for supporting one lateral edge of at least a portion of said sheet on the upper run thereof, and means for supporting and driving the chains to move the upper and lower runs in said endless path of travel and advance said portion of said sheet on said upper run to a position between said mold parts and remove it therefrom after it has been formed, said latter means including chain support and guide means mounted by said frame between said upper and lower runs and extending substantially from one end of each chain to the other; sheet guide members having guide surfaces extending above the upper runs of said chains to positively guide the upper surfaces of the lateral edges of said sheet; upper run chain guide members extending alongside said upper runs and positioned to permit the lateral edges of said sheet to extend above and laterally outwardly of said outer sides of said links, said*

*chain guide members having under guide surfaces spaced laterally outwardly of the laterally outer sides of the links in the upper runs of said chains; and a plurality of elongate lateral projections on said links projecting laterally outwardly of said laterally outer portions of the links and positioned vertically to normally laterally align with said under guide surfaces when the links are traveling along said upper runs so that the projections on the links on the upper runs ride along the guide surfaces of said upper run chain guide members to maintain said projections in the same horizontal disposition and prevent said chains and projections from cocking.*

References Cited

The following references, cited by the Examiner, are of record in the patented file of this patent or the original patent.

UNITED STATES PATENTS

| | | | |
|---|---|---|---|
| 941,083 | 11/1909 | Manbeck | 425—392 |
| 1,904,268 | 4/1933 | Bronson | 425—298 X |
| 2,522,956 | 9/1950 | Middleton | 425—302 X |
| 3,072,964 | 1/1963 | Tilden | 425—388 |
| 3,081,491 | 3/1963 | Black | 425—292 |
| 3,103,701 | 9/1963 | Calchera et al. | 425—406 |
| 3,105,270 | 10/1963 | Fibish | 425—145 |
| 3,179,980 | 4/1965 | Ryan et al. | 425—388 |
| 3,228,066 | 1/1966 | Rippstein | 425—291 |
| 3,240,851 | 3/1966 | Sealora | 425—302 X |
| 3,244,780 | 4/1966 | Levey et al. | 425—388 X |
| 3,160,340 | 12/1964 | Menkel | 226—53 |
| 3,265,265 | 8/1966 | Lewi | 266—2 |
| 3,329,995 | 7/1967 | O'Brien et al. | 425—142 |
| 3,346,923 | 10/1967 | Brown | 425—162 |
| 3,350,744 | 11/1967 | Soderlund | 425—305 |
| 3,359,600 | 12/1967 | O'Brien et al. | 425—157 |

FOREIGN PATENTS

| | | |
|---|---|---|
| 1,091,316 | 10/1960 | Germany. |

R. SPENCER ANNEAR, Primary Examiner

U.S. Cl. X.R.

425—174, 306, 388, 437, DIG 48; 226—53, 173